July 8, 1924.
C. A. VAN DERSON
VALVE
Filed June 17, 1921
1,500,908
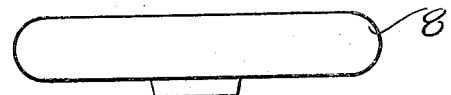
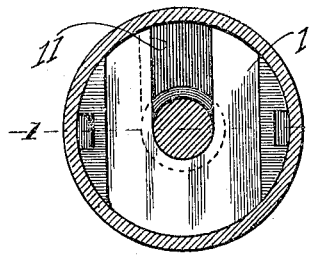
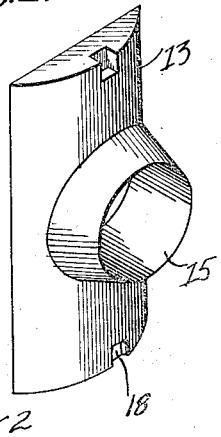
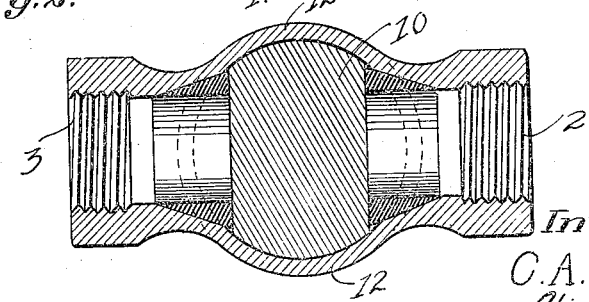
Inventor.
C. A. Van Derson Patented July 8, 1924.

1,500,908

UNITED STATES PATENT OFFICE.

CURTIS A. VAN DERSON, OF MODESTO, CALIFORNIA.

VALVE.

Application filed June 17, 1921. Serial No. 478,389.

*To all whom it may concern:*

Be it known that I, CURTIS A. VAN DERSON, a citizen of the United States, residing at Modesto, in the county of Stanislaus and State of California, have invented new and useful Improvements in Valves, of which the following is a specification.

My invention while relating to valves capable of general application in liquid distributing systems has specific reference to an improved type of valve for use in connection with piping systems handling liquids for human consumption.

The primary object of my invention is to produce a valve which will meet all requirements for a sanitary structure so that the same may be used in instances where cleanliness is essential.

A further object is to produce a valve of the character described which may be manufactured at a modest cost and with the parts thereof easily assembled or taken apart when required.

Other objects and advantages of this invention will be apparent during the course of the following description.

In the accompanying drawings forming a part of this specification, and in which like numerals are employed to designate like parts throughout the same:

Fig. 1 is a vertical section on the line 1—1, Fig. 3,

Fig. 2 is a transverse section on the line 2—2, Fig. 1,

Fig. 3 is a similar section on the line 3—3, Fig. 1, and

Fig. 4 is a detail perspective view of one of the wedge shaped adapter seats.

In the drawings wherein for the purpose of illustration is shown a preferred embodiment of my invention, numeral 1 indicates the valve body which according to the present form includes opposed threaded openings 2 and 3, which enable the valve to be incorporated in the pipe line of a distributing system. The open top of the valve body is internally threaded to receive the bonnet 4, which in turn is made with a central bore having machine or the like threads in its most restricted portion to receive and cooperate with the threads 5 on the stem 6. The stem 6 extends through the central bore of the bonnet and projects through the stuffing box 7 at the upper end thereof and terminates in a hand grip 8. The opposite end of the stem preferably terminates in a button 9, so that the same may be connected to the gate 10, through means of the open ended slot 11, made in the top of the gate. This slot 11 is undercut to correspond to the button 9, so that the button may be introduced in the open end of the slot and moved inwardly to center the stem vertically of the gate. It is of course understood that the stem can only be removed or attached when the bonnet 4 is removed and the gate 10 raised at least slightly above the opening in the top of the valve body.

The gate 10 is only raised and lowered by the stem and not rotated, the slot and button connection being devised primarily for this purpose.

As will be seen from Fig. 2, two sides of the gate 10 are curved or rounded as at 12, to correspond to the inner circumference of the cylindrical wall of the valve body and with which they are made to frictionally contact at diametrically opposite sides. The two other sides of the gate are flat and contact directly with corresponding flat surfaces on the inside of the wedge shaped adapter seats 13 and 14. These seats are preferably two in number with one arranged adjacent each of the opposed openings 2 and 3, and also having frustum shaped sleeved openings 15 on their curved sides which are co-axially seated within the openings 2 and 3. The inside beginning of the openings 2 and 3 are beveled to correspond to the shape of the sleeved openings 15 to insure a tight wedge like fit. The thickness of the adapter seats increases from the top to the bottom, which leaves the gate area between their confronting flat faces substantially the shape of a modified cone, and the gate is shaped to correspond to the same so that a wedging effect is realized, which may be relied upon to maintain the adapter seats pressed tightly against the walls of the valve body with the sleeved openings thereof wedged tightly within the opposed openings 2 and 3.

To prevent the adapter seats from being displaced a lug 16 is provided in the center of the screw cap 17, which closes the bottom of the valve. This lug is presented between the seats but does not contact with them when they are in normal position.

To clean the valve the bonnet 4 is removed which carries with it the gate 10, thus leaving the adapter seats 13 and 14 free to move inwardly, withdrawing their sleeved openings 15 from the opposed openings 2 and 3, whereupon the seats may be removed from the valve. The screw cap 17 should also be taken off to leave the inside of the valve totally exposed so that a brush or other swabbing device may be used to clean the same. It is to be noted that there are no corners or other unaccessible crevices to collect foreign matter, thus the valve may be kept absolutely clean. Should the adapter plates stick a screw driver or the like may be used in the notches 18 to pry them loose.

It is of course understood that the parts removed from the valve body are thoroughly cleaned when taken out.

It is to be understood that the form of my invention herewith shown and described, is to be taken as a preferred example of the same, and that various changes in the shape, size and arrangement of parts may be resorted to without departing from the spirit of the invention or the scope of the subjoined claim.

Having thus described my invention, I claim:

A valve of the class described, including a body portion, oppositely disposed co-axial inlet and outlet openings in said body, adapter seats each having a tapered sleeved opening inserted in said inlet and outlet openings, the inside faces of said seats being flat and spaced apart, a non-rotatable gate adapted to be raised and lowered between said flat faces of said adapter seats for the purpose of controlling the port area between said inlet and outlet openings, means for raising and lowering said gate and means provided for the ready removal of said adapter seats without removing said gate from its position within the body of said valve.

In testimony whereof I affix my signature.

CURTIS A. VAN DERSON.